(12) United States Patent
Sugita et al.

(10) Patent No.: US 8,368,258 B2
(45) Date of Patent: Feb. 5, 2013

(54) ARMATURE FOR LINEAR MOTOR (75) Inventors: Satoshi Sugita, Nagano (JP); Yasushi Misawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 11 days.

(21) Appl. No.: 13/203,768

(22) PCT Filed: Mar. 5, 2009

(86) PCT No.: PCT/JP2009/054183
§ 371 (c)(1),
(2), (4) Date: Aug. 29, 2011

(87) PCT Pub. No.: WO2010/100742
PCT Pub. Date: Sep. 10, 2010

(65) Prior Publication Data
US 2011/0316358 A1 Dec. 29, 2011

(51) Int. Cl.
H02K 41/02 (2006.01)

(52) U.S. Cl. ............ 310/12.29; 310/52; 310/54; 310/58

(58) Field of Classification Search ............... 310/12.29, 310/12.02, 12.27, 12.33, 12.23, 52, 54, 58–59
See application file for complete search history.

(56) References Cited

U.S. PATENT DOCUMENTS

| 3,913,045 | A | 10/1975 | Von Starck |
| 5,783,877 | A * | 7/1998 | Chitayat .................... 310/12.33 |
| 2004/0130223 | A1* | 7/2004 | Nimz et al. .................... 310/58 |
| 2011/0198946 | A1* | 8/2011 | Koshimoto et al. ........ 310/12.29 |

FOREIGN PATENT DOCUMENTS

| JP | 50-044406 | 4/1975 |
| JP | 2000-227031 | 8/2000 |
| JP | 2002-075889 | 3/2002 |
| JP | 2004-215419 | 7/2004 |
| JP | 2005-237059 | 9/2005 |
| JP | 2006-081244 | 3/2006 |
| JP | 2008-035698 | 2/2008 |

* cited by examiner

Primary Examiner — Tran Nguyen
Assistant Examiner — Leda Pham
(74) Attorney, Agent, or Firm — Rankin, Hill & Clark LLP (57) ABSTRACT A linear motor armature in which pressure loss of a coolant flowing in a cooling conduit and possible significant non-uniformity in temperature distribution are reduced over the entire armature. A manifold 5, 6h and a pair of cooling conduits 7, 9 are configured such that a coolant is supplied from one connecting conduit 27 of the cooling conduit 7, and one connecting conduit 33 of the cooling conduit 9, and discharged from the other connecting conduit 29 of the cooling conduit 7 and the other connecting conduit 35 of the cooling conduit 9.

12 Claims, 5 Drawing Sheets

ARMATURE FOR LINEAR MOTOR

TECHNICAL FIELD

The present invention relates to a linear motor armature.

BACKGROUND ART

Japanese Patent Application Publication No. 2008-35698 discloses a linear motor armature including an armature core including a yoke extending straight and a plurality of pole teeth fixed to the yoke and disposed along the yoke, and a plurality of excitation windings configured to excite the plurality of pole teeth. In the linear motor armature, in order to cool heat produced from the plurality of excitation windings, a cooling conduit inside which a coolant flows is disposed in slots each formed between two adjacent pole teeth to interpose part of the excitation windings. The cooling conduit is formed by bending a single pipe zigzag.

Patent Document 1: Japanese Patent Application Publication No. 2008-35698

DISCLOSURE OF INVENTION

Technical Problems

In conventional linear motor armatures, however, the cooling conduit is so long that pressure loss of the coolant may be large. In addition, the temperature gradient of the coolant in the cooling conduit is so large that significant non-uniformity may be caused in temperature distribution over the entire armature.

An object of the present invention is to provide a linear motor armature in which pressure loss of a coolant flowing in a cooling conduit is reduced and possible significant non-uniformity in temperature distribution is suppressed over the entire armature.

Another object of the present invention is to provide a linear motor armature having a simple structure for circulation of the coolant in the cooling conduit.

A further object of the present invention is to provide a linear motor armature with a volume occupied thereby being suppressed from increasing.

Still another object of the present invention is to provide a linear motor armature with an enhanced effect of cooling a plurality of excitation windings.

Solution to Problems

A linear motor armature, of which improvement is aimed at by the present invention, includes an armature core, a plurality of excitation windings, and a cooling device. The armature core includes a yoke extending straight and a plurality of pole teeth fixed to the yoke and disposed along the yoke. The plurality of pole teeth are spaced in a longitudinal direction of the yoke such that a slot is formed between two adjacent pole teeth. Magnetic pole surfaces of the plurality of pole teeth may be coupled to each other by a magnetic material. That is, opening portions of the slots on a side of the magnetic pole surfaces may be blocked by a magnetic material. The plurality of excitation windings are at least partially disposed in the slots formed in the armature core to excite the plurality of pole teeth. The cooling device is configured to cool the plurality of excitation windings using a coolant. The cooling device includes a first cooling conduit, a second cooling conduit, and a manifold. The first cooling conduit includes: a first main conduit running zigzag, the first main conduit including a plurality of straight conduits extending inside the slots and a plurality of coupling conduits, each of which couples two adjacent straight conduits such that the plurality of straight conduits are connected in series; and a first pair of connecting conduits provided at both ends of the first main conduit. The second cooling conduit includes: a second main conduit running zigzag and opposed to the first main conduit via the plurality of excitation windings, the second main conduit including a plurality of straight conduits extending inside the slots and a plurality of coupling conduits, each of which couples two adjacent straight conduits such that the plurality of straight conduits are connected in series; and a second pair of connecting conduits provided at both ends of the second main conduit. The manifold is provided to supply the coolant to the first cooling conduit and the second cooling conduit. In the present invention, the manifold and the first and second pairs of connecting conduits are configured such that the coolant is supplied from one connecting conduit of the first pair of connecting conduits and one connecting conduit of the second pair of connecting conduits and discharged from the other connecting conduit of the first pair of connecting conduits and the other connecting conduit of the second pair of connecting conduits.

If the coolant is supplied from one connecting conduit of the first pair of connecting conduits and one connecting conduit of the second pair of connecting conduits and discharged from the other connecting conduit of the first pair of connecting conduits and the other connecting conduit of the second pair of connecting conduits as in the present invention, the coolant flows in the two cooling conduits (first and second cooling conduits) in parallel to cool the excitation windings. Therefore, the length of each cooling conduit may be reduced to a half of that of a conventional cooling conduit, and the pressure loss may be reduced to a quarter or less of that of the conventional cooling conduit. In addition, the temperature gradient of the coolant in the cooling conduit may be reduced compared to the conventional cooling conduits, thereby reducing non-uniformity in temperature distribution over the entire armature.

The manifold may be fixed to the armature core, and may include one coolant inlet port, two coolant delivery ports each communicating with the one coolant inlet port, one coolant outlet port, and two coolant discharge ports each communicating with the one coolant outlet port. In this configuration, the first and second pairs of connecting conduits are preferably shaped such that the one connecting conduit of the first pair of connecting conduits of the first cooling conduit and the one connecting conduit of the second pair of connecting conduits of the second cooling conduit are connected to the two coolant delivery ports, and that the other connecting conduit of the first pair of connecting conduits of the first cooling conduit and the other connecting conduit of the second pair of connecting conduits of the second cooling conduit are connected to the two coolant discharge ports. With this configuration, it is only necessary that the manifold should be provided with one coolant inlet portion (coolant inlet port) and one coolant outlet portion (coolant outlet port) even if the two cooling conduits disposed in parallel are used. With this structure, the structure of the manifold may be simplified, thereby simplifying the structure for circulation of the coolant in the cooling conduits.

The manifold may be fixed in the vicinity of one side surface of the armature core that is located in a direction in which the slots extend. In this configuration, preferably, the first and second pairs of connecting conduits are disposed in a connecting conduit installation space located above the one side surface, and the two coolant delivery ports and the two coolant discharge ports of the manifold each open toward the connecting conduit installation space. With this configuration, the length of the first and second pair of connecting conduits may be reduced, and the volume occupied by the linear motor armature may also be reduced.

When the manifold described above is used, it is necessary that the connecting conduit of the first pair of connecting conduits that extends toward the manifold from a side opposite to a side where the manifold is located and the connecting conduit of the second pair of connecting conduits that extends toward the manifold from a side opposite to the side where the manifold is located should intersect each other. In this configuration, the two connecting conduits may preferably intersect each other in the connecting conduit installation space to form an intersecting portion, and the intersecting portion may also preferably is at least partially located between the plurality of coupling conduits included in the first main conduit and the plurality of coupling conduits included in the second main conduit. With this configuration, a structure in which the two connecting conduits intersect each other may easily be formed utilizing the connecting conduit installation space. In addition, the connecting conduits of the cooling conduits may be compactly housed in the connecting conduit installation space even though the two cooling conduits are used.

The plurality of pole teeth may include a plurality of wound pole teeth on which the excitation windings are wound and a plurality of non-wound pole teeth on which the excitation windings are not wound. In this configuration, the intersecting portion discussed above may be located above the non-wound pole teeth. With this configuration, the intersecting portion may be provided in the proximity of the non-wound pole teeth with no excitation windings wound thereon. Therefore, the intersecting portion does not project to increase the volume occupied by the linear motor armature even though the two cooling conduits are used.

The first and second pairs of connecting conduits may preferably be disposed such that the coolant flows through one of the first and second main conduits in a direction from the side where the manifold is located to the opposite side, and that the coolant flows through the other of the first and second main conduits in a direction from the opposite side to the side where the manifold is located. With this configuration, the temperature gradient of the coolant in the first main conduit and the temperature gradient of the coolant in the second main conduit are inverted from each other, thereby reducing non-uniformity in temperature distribution over the entire armature.

Pipes used for the first and second cooling conduits may each have a rectangular cross-sectional shape, and one of outer surfaces of each of the first and second cooling conduits may face the excitation windings. Then, the area over which the first and second cooling conduits and the excitation windings face each other may be increased, thereby enhancing the effect of cooling heat produced by the excitation windings.

BEST MODE FOR CARRYING OUT THE INVENTION

An embodiment of the present invention will be described in detail below with reference to the drawings. FIGS. 1 to 4 are respectively a front view, a plan view, a back view, and a left side view of a linear motor armature according to the embodiment of the present invention. As shown in the drawings, the linear motor armature according to the embodiment forms a mover of a linear motor, and includes an armature core 1, six excitation windings 3, a manifold body 5, and first and second cooling conduits 7 and 9. The armature core 1 includes a yoke 11, and 13 pole teeth (13, 15). The yoke 11 extends straight in a left-right direction (or a longitudinal direction) on the paper of FIG. 1. The 13 pole teeth (13, 15) are disposed along the longitudinal direction of the yoke 11 (or the direction in which the mover of the linear motor moves). The 13 pole teeth (13, 15) are spaced in the longitudinal direction of the yoke 11 such that a slot 17 is formed between two adjacent pole teeth (13, 15). The pole teeth (13, 15) have magnetic pole surfaces 13a and 15a facing a permanent magnet array of a stator of the linear motor (not shown) via a gap. End portions of the 13 pole teeth (13, 15), which are located opposite to the magnetic pole surfaces 13a and 15b, are each coupled to the yoke 11. Of the pole teeth (13, 15), seven pole teeth 13 are integrally formed with the yoke 11 to form non-wound pole teeth on which the excitation windings 3 are not wound, and six pole teeth 15 are separately formed from the yoke 11 to form wound pole teeth on which the excitation windings 3 are wound. Outer surfaces of the excitation windings 3 are covered with insulating paper. The seven non-wound pole teeth 13 and the six wound pole teeth 15 are alternately disposed in the longitudinal direction of the yoke 11 with the non-wound pole teeth 13 located at both ends in the longitudinal direction of the yoke 11. The wound pole teeth 15 are shaped to become the same shape as the non-wound pole teeth 13 when the wound pole teeth 15 are fitted with the yoke 11 through a fitting structure. As representatively indicated by the wound pole tooth 15 at the right end of FIG. 3, each of the wound pole teeth 15 includes, at its end portion, a fitting portion 15a having a trapezoidal shape to be fitted with a fitted portion 11a of the yoke 11, and a base portion 15b continuously formed with the fitting portion 15a. Each of the wound pole teeth 15 is attached to the yoke 11 by fitting the fitting portion 15a and the base portion 15b of the wound pole tooth 15 with the fitted portion 11a of the yoke 11.

Figure 3:
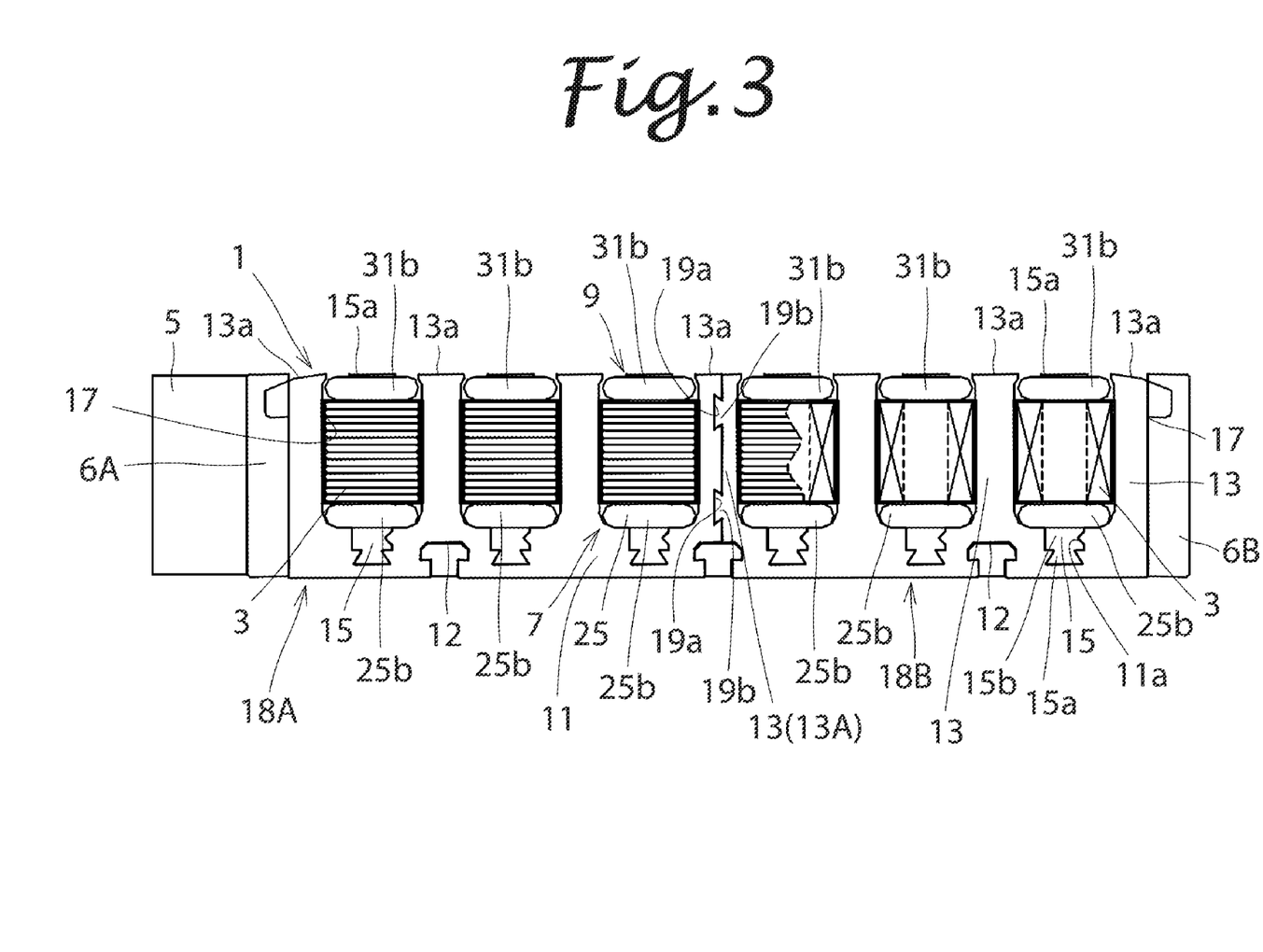
FIG. 3 is a back view of the linear motor armature shown in FIG. 1.
Figure 4:
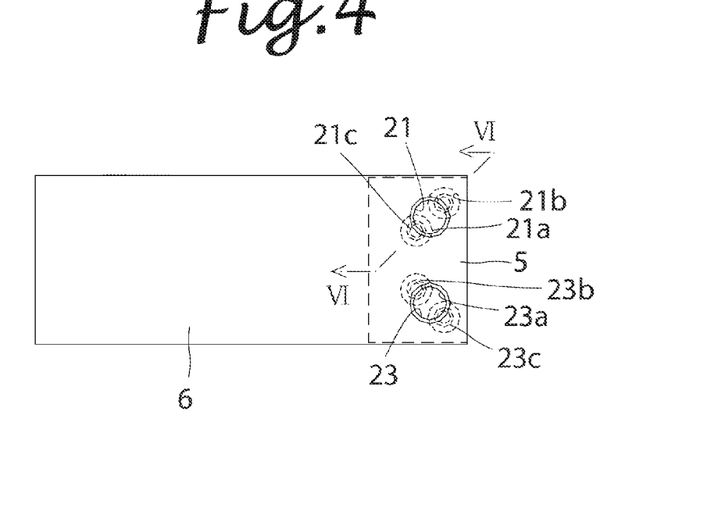
FIG. 4 is a left side view of the linear motor armature shown in FIG. 1.

In the embodiment, the armature core 1 is formed by two split armature core units 18A and 18B. As shown in FIG. 3, the split armature core unit 18A is formed with two recessed portions 19a, and the split armature core unit 18B is formed with two projecting portions 19b. The projecting portions 19b each have a trapezoidal shape. The recessed portions 19a each have a shape that may be fitted with each of the projecting portions 19b. The armature core 1 and the non-wound pole tooth 13 (13A) at the middle of the armature core 1 in the longitudinal direction are formed with the projecting portions 19b and the recessed portions 19a fitted with each other. In the embodiment, a plurality of steel plates are stacked in a direction that is orthogonal to the longitudinal direction of the yoke 11 to form an assembly of the yoke 11 and the non-wound pole teeth 13 included in the split armature core unit 18A, and the wound pole teeth 15, as well as an assembly of the yoke 11 and the non-wound pole teeth 13 included in the split armature core unit 18B, and the wound pole teeth 15.

The manifold body 5 is made of a metal material such as aluminum, brass, or stainless steel, and attached to the armature core 1 via an end bracket 6A of a mounting member 6. The mounting member 6 is formed by a pair of end brackets 6A and 6B fixed to both ends of the yoke 11 in the longitudinal direction, and a mounting plate 6C (only shown in FIG. 2 and not shown in FIG. 3) fixed to the back surface of the yoke 11 utilizing fitting grooves 12. The end bracket 6A includes an abutment portion 6d (FIG. 1) abutting on an end surface of the armature core 1 in the longitudinal direction of the yoke 11, and end portions 6e and 6f (FIG. 2) abutting on side surfaces of the armature core 1 that are located on both sides in the direction in which the slots 17 extend. A connecting conduit installation space S, in which first and second pairs of connecting conduits (27, 29, 33, 35) are disposed, is formed above one side surface (or a side surface on one side in the direction in which the slots 17 extend) 2 of the armature core 1 that is located between the end portion 6e of the end bracket 6A and an end portion 6g of the other end bracket 6B. The first and second pairs of connecting conduits (27, 29, 33, 35) will be described later.

The manifold body 5 has a rectangular parallelepiped profile, and is fixed to a surface of the end bracket 6A opposite to a side where the connecting conduit installation space S is located to supply a coolant to the first cooling conduit 7 and the second cooling conduit 9. When viewed differently, the manifold body 5 is fixed in the vicinity of the side surface 2 of the armature core 1 which is located in the direction in which the slots 17 extend. In the embodiment, the manifold body 5 and an end portion 6h of the end bracket 6A to which the manifold body 5 is fixed form a manifold. This is because flow passages (21b, 21c, etc.) are formed across the inside of the manifold body 5 and the inside of the end portion 6h of the end bracket 6A.

Figure 1:
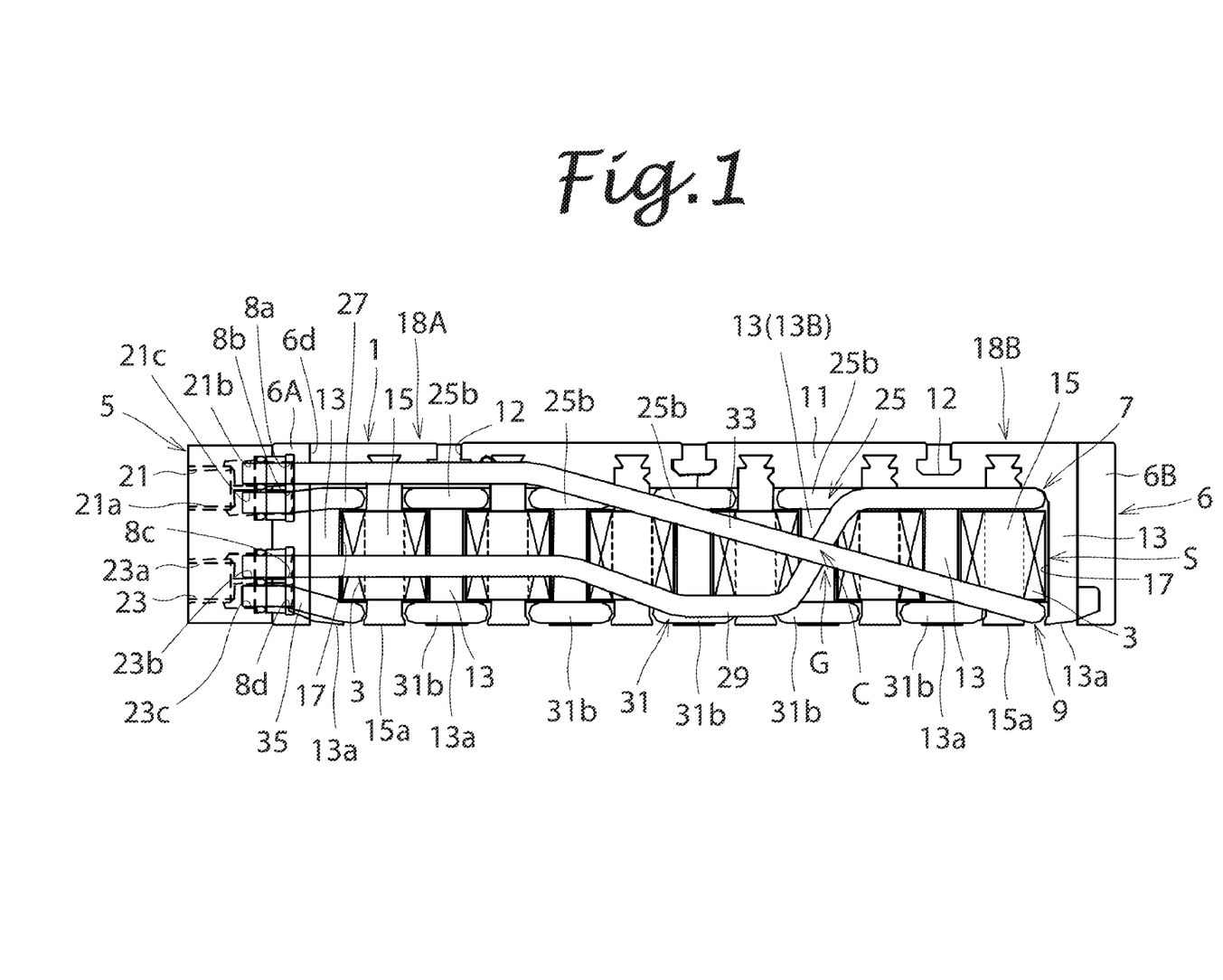
FIG. 1 is a front view of a linear motor armature according to an embodiment of the present invention.

As shown in FIG. 1, the manifold body 5 is provided with an inlet through hole 21 and an outlet through hole 23. The inlet through hole 21 is formed by a coolant inlet port 21a and two coolant delivery ports 21b and 21c. The coolant inlet port 21a opens toward a side of the manifold body 5 opposite to the side where the connecting conduit installation space S is located. A hose (not shown) through which the coolant is supplied is fitted to the coolant inlet port 21a. The two coolant delivery ports 21b and 21c communicate respectively with through passages 8a and 8b formed in the end bracket 6A. The two coolant delivery ports 21b and 21c also communicate with the coolant inlet port 21a at the middle of the manifold body 5. As a result of this structure, the two coolant delivery ports 21b and 21c open toward the connecting conduit installation space S.

The outlet through hole 23 is formed by a coolant outlet port 23a and two coolant discharge ports 23b and 23c. The coolant outlet port 23a opens toward the side of the manifold body 5 opposite to the side where the connecting conduit installation space S is located. A hose (not shown) through which the coolant is discharged is fitted to the coolant outlet port 23a. The two coolant discharge ports 23b and 23c communicate respectively with through passages 8c and 8d formed in the end bracket 6A. The two coolant discharge ports 23b and 23c also communicate with the coolant outlet port 23a at the middle of the manifold body 5. As with the two coolant delivery ports 21b and 21c, the two coolant discharge ports 23b and 23c open toward the connecting conduit installation space S.

Figure 2:
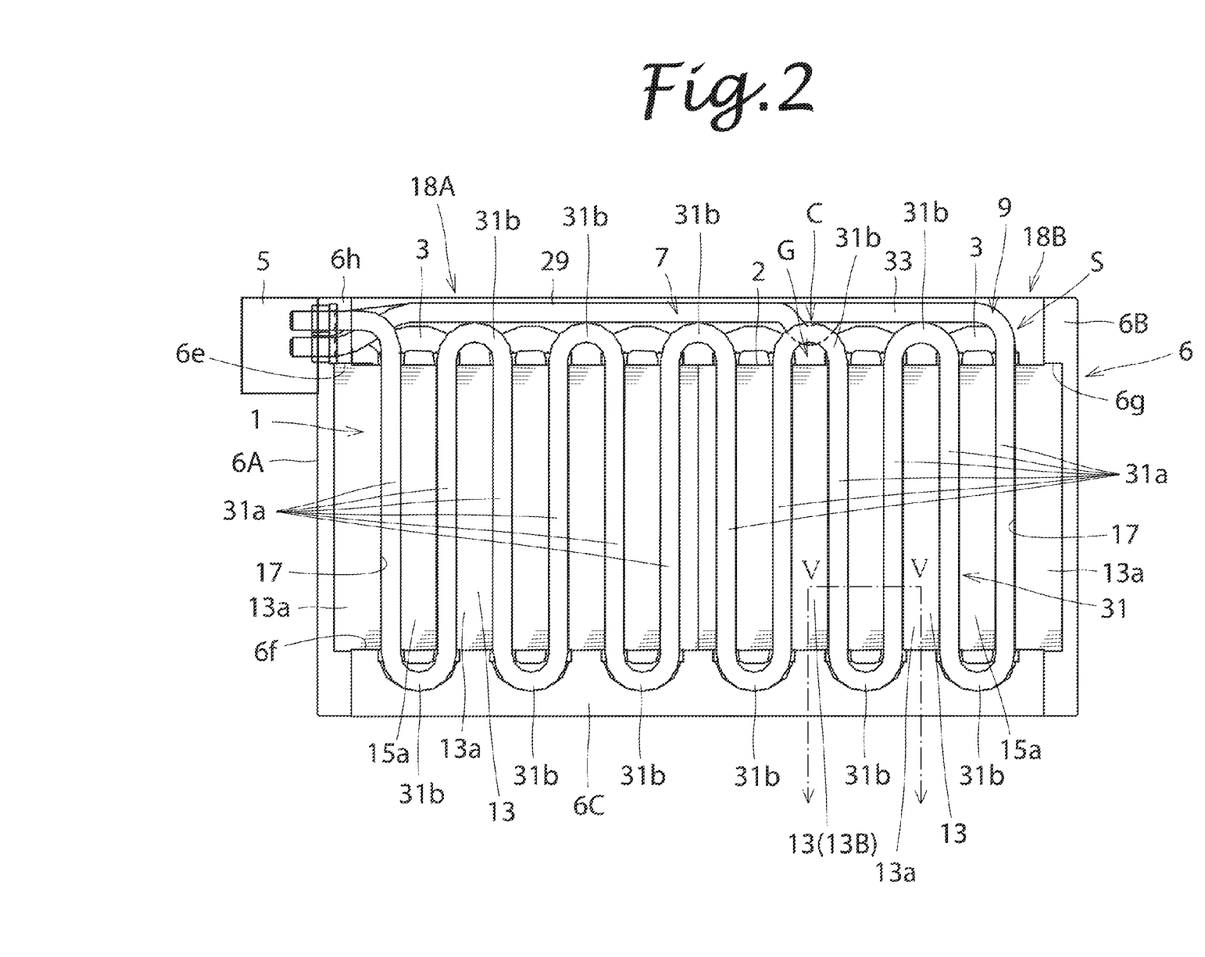
FIG. 2 is a plan view of the linear motor armature shown in FIG. 1.
Figure 5:
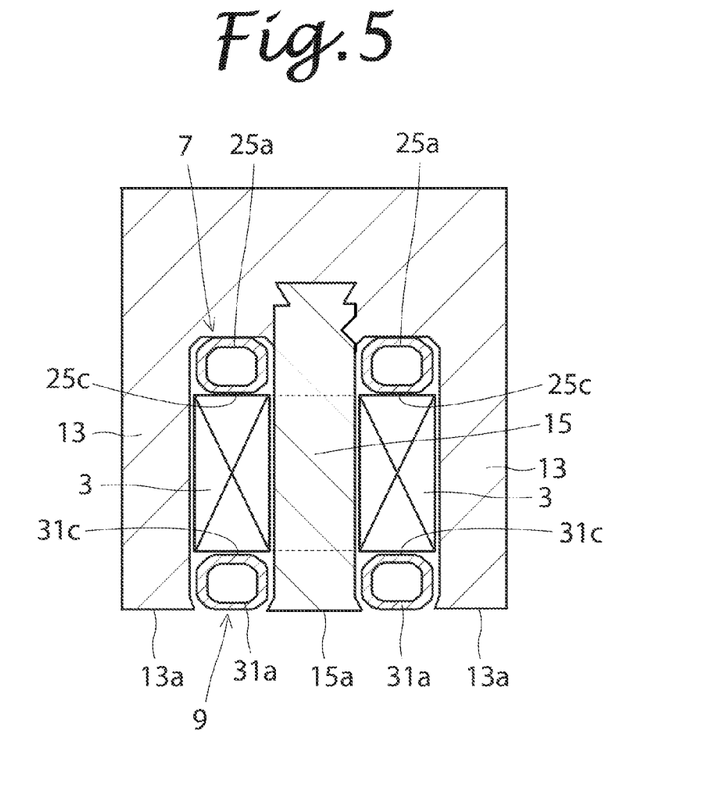
FIG. 5 is a cross-sectional view taken along line V-V of FIG. 2.

The coolant flows inside the first and second cooling conduits 7 and 9 installed in the armature core 1 to absorb heat produced from the excitation windings 3. The first cooling conduit 7 is formed by bending a single copper pipe, on the surface of which an insulating film made of a polyester tape having a thickness of 0.1 mm or made by electrodeposition coating is formed, and includes a first main conduit 25 and a first pair of connecting conduits 27 and 29. As shown in FIG. 5 which is a cross-sectional view taken along line V-V of FIG. 2, the pipe used as the first cooling conduit 7 has a rectangular cross-sectional profile. As shown in FIGS. 1 to 3, the first main conduit 25 includes 12 straight conduits 25a (FIG. 5) disposed in 12 slots 17 to extend along the wall surfaces of the 12 slots 17 on the yoke 11 side, and 11 coupling conduits 25b, each of which couples two adjacent straight conduits 25a of the 12 straight conduits 25a such that the 12 straight conduits 25a are connected in series. The first main conduit 25 runs zigzag as a whole. Although not shown in FIGS. 1 to 3, the straight conduits 25a are opposed to straight conduits 31a shown in FIG. 2 via the excitation windings 3. The straight conduits 31a will be described later. As shown in FIG. 5, one outer surface 25c of each of the straight conduits 25a faces the excitation windings 3.

As shown in FIGS. 1 and 2, the first pair of connecting conduits 27 and 29 are provided at both ends of the first main conduit 25. One connecting conduit 27 of the first pair of connecting conduits 27 and 29 is disposed in the connecting conduit installation space S to extend toward the manifold body 5 from one end portion of the first main conduit 25 that is located on the side where the manifold body 5 is located. The other connecting conduit 29 of the first pair of connecting conduits 27 and 29 is disposed in the connecting conduit installation space S to extend through the connecting conduit installation space S toward the manifold body 5 from the other end portion of the first main conduit 25 that is located on the end bracket 6B side.

The second cooling conduit 9 is formed by bending a single copper pipe, on the surface of which an insulating film made of a polyester tape having a thickness of 0.1 mm or made by electrodeposition coating is formed, and includes a second main conduit 31 and a second pair of connecting conduits 33 and 35. As shown in the cross-sectional view of FIG. 5, the second cooling conduit 9 has a rectangular cross-sectional profile as with the first cooling conduit 7. As shown in FIGS. 1 to 3, the second main conduit 31 includes 12 straight conduits 31a extending in end portions of the 12 slots 17 on the side of the magnetic pole surfaces 13a and 15a, and 11 coupling conduits 31b, each of which couples two adjacent straight conduits 31a of the 12 straight conduits 31a such that the 12 straight conduits 31a are connected in series. The second main conduit 31 runs zigzag as a whole. The first main conduit 25 and the second main conduit 31 are opposed to each other via part of the excitation windings 3 provided in the 12 slots 17. As shown in FIG. 5, one outer surface 31c of each of the straight conduits 31a faces the excitation windings 3. As shown in FIGS. 1 and 2, the second pair of connecting conduits 33 and 35 are provided at both ends of the second main conduit 31. One connecting conduit 33 of the second pair of connecting conduits 33 and 35 is disposed in the connecting conduit installation space S to extend through the connecting conduit installation space S toward the manifold body 5 from one end portion of the second main conduit 31 that is located on the end bracket 6B side. The other connecting conduit 35 of the second pair of connecting conduits 33 and 35 is disposed in the connecting conduit installation space S to extend toward the manifold body 5 from the other end portion of the second main conduit 31 that is located on the side where the manifold body 5 is located.

Figure 6:
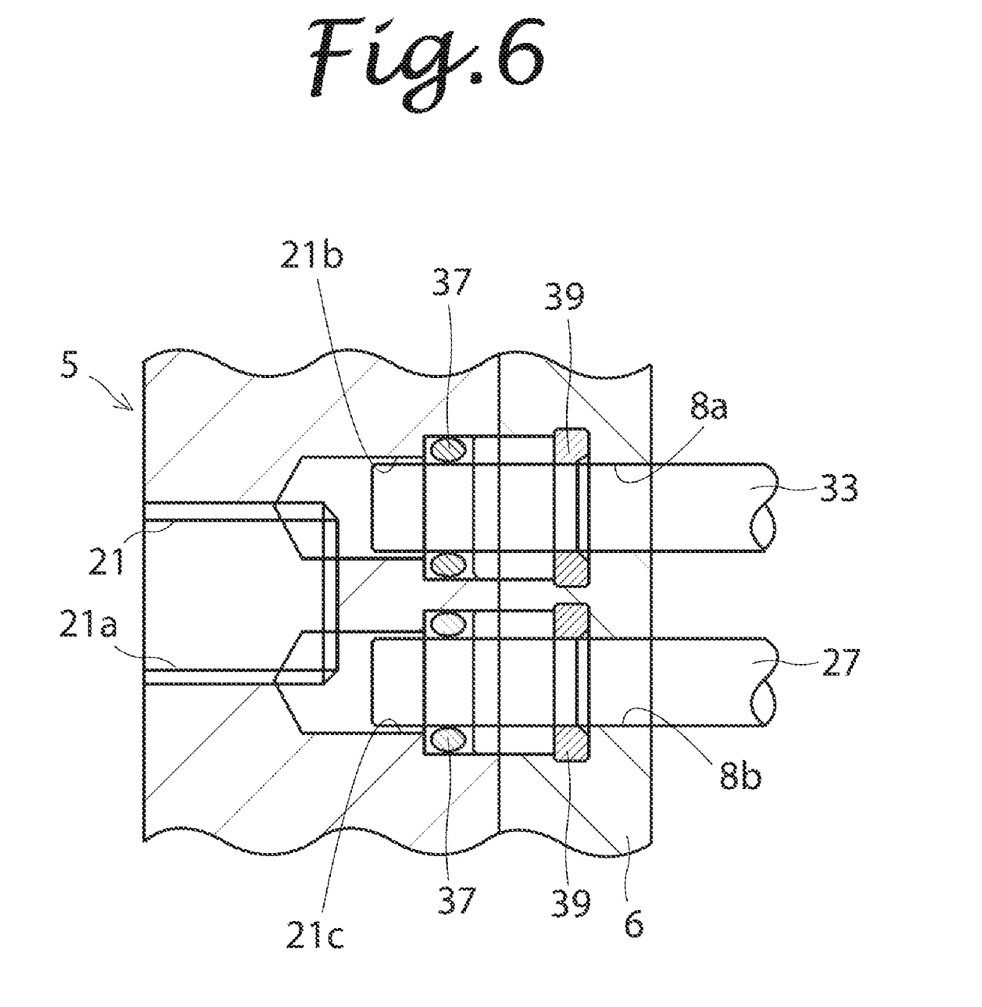
FIG. 6 is a cross-sectional view taken along line VI-VI of FIG. 4.

The connecting conduit 29 and the connecting conduit 33 intersect each other above the non-wound pole tooth 13 (13B) in the connecting conduit installation space S to form an intersecting portion C. The intersecting portion C is partially located between the coupling conduits 25*b* and the coupling conduits 31*b*. An end portion of the connecting conduit 27 is fitted into the through passage 8*b* and the coolant delivery port 21*c*. An end portion of the connecting conduit 33 is fitted into the through passage 8*a* and the coolant delivery port 21*b*. An end portion of the connecting conduit 29 is fitted into the through passage 8*c* and the coolant discharge port 23*b*. An end portion of the connecting conduit 35 is fitted into the through passage 8*d* and the coolant discharge port 23*c*. Specifically, as shown in FIG. 6 which is a cross-sectional view taken along line VI-VI of FIG. 4, the end portion of the connecting conduit 27 is fitted into the through passage 8*b* and the coolant delivery port 21*c* in a sealed state through an O-ring 37 disposed in the coolant delivery port 21*c* and a resin ring 39 disposed in the through passage 8*b*. The end portion of the connecting conduit 33 is fitted into the through passage 8*a* and the coolant delivery port 21*b* in a sealed state through an O-ring 37 disposed in the coolant delivery port 21*b* and a resin ring 39 disposed in the through passage 8*a*. Likewise, the end portion of the connecting conduit 29 is fitted into the through passage 8*c* and the coolant discharge port 23*b* in a sealed state through an O-ring 37 and a resin ring 39. The end portion of the connecting conduit 35 is fitted into the through passage 8*d* and the coolant discharge port 23*c* in a sealed state through an O-ring 37 and a resin ring 39. Thus, the manifold (5, 6*h*), the first pair of connecting conduits 27 and 29, and the second pair of connecting conduits 33 and 35 are configured such that the coolant is supplied from one connecting conduit 27 of the first pair of connecting conduits 27 and 29 and one connecting conduit 33 of the second pair of connecting conduits 33 and 35 and discharged from the other connecting conduit 29 of the first pair of connecting conduits 27 and 29 and the other connecting conduit 35 of the second pair of connecting conduits 33 and 35. In the embodiment, the first and second cooling conduits 7 and 9 and the manifold (5, 6*h*) form a cooling device configured to cool the six excitation windings 3 using the coolant.

With the cooling device configured as described above, part of the coolant having flowed into the coolant inlet port 21*a* passes through the connecting conduit 27 to enter the first main conduit 25, and flows in the first main conduit 25 from the side where the manifold body 5 is located. The coolant then flows in the connecting conduit 29 to be discharged through the coolant outlet port 23*a*. Meanwhile, other part of the coolant having flowed into the coolant inlet port 21*a* passes through the connecting conduit 33 to enter the second main conduit 31, and flows in the second main conduit 31 from the side opposite to the side where the manifold body 5 is located to be discharged through the coolant outlet port 23*a*. Consequently, the coolant flowing in the first main conduit 25 cools the excitation windings 3 from their end portions on the yoke 11 side, and the coolant flowing in the second main conduit 31 cools the excitation windings 3 from their end portions on the side of the magnetic pole surfaces 13*a* and 15*a*. In addition, the coolant flowing in the first main conduit 25 cools the excitation windings 3 from the side where the manifold body 5 is located, and the coolant flowing in the second main conduit 31 cools the excitation windings 3 from the side opposite to the side where the manifold body 5 is located. Therefore, the excitation windings 3 may be cooled from both the side where the manifold body 5 is located and the opposite side, thereby preventing significant non-uniformity in temperature distribution over the entire armature.

According to the linear motor armature of the embodiment, the coolant flows in the two cooling conduits (first and second cooling conduits 7 and 9) in parallel to cool the six excitation windings 3. Therefore, the length of each cooling conduit is reduced to a half of that of conventional cooling conduits, and the pressure loss is reduced to a quarter or less of that of the conventional cooling conduits. In addition, the manifold body 5 includes one coolant inlet port 21*a*, two coolant delivery ports 21*b* and 21*c* each communicating with the one coolant inlet port 21*a*, one coolant outlet port 23*a*, and two coolant discharge ports 23*b* and 23*c* each communicating with the one coolant outlet port 23*a*. Thus, it is only necessary that the manifold body 5 should be provided with one coolant inlet portion (coolant inlet port 21*a*) and one coolant outlet portion (coolant outlet port 23*a*) even though the two cooling conduits 7 and 9 disposed in parallel are used. Therefore, the structure of the manifold body 5 may be simplified, thereby simplifying the structure for circulation of the coolant in the cooling conduits 7 and 9.

Industrial Applicability

According to the present invention, a coolant flows in two cooling conduits in parallel to cool a plurality of excitation windings. Therefore, the length of each cooling conduit may be reduced to a half of that of conventional cooling conduits, and the pressure loss may be reduced to a quarter or less of that of the conventional cooling conduits. Further, according to the present invention, possible significant non-uniformity in temperature distribution over the entire armature may be suppressed. According to the present invention, an increased spatial volume occupied by the linear motor armature may also be suppressed.

The invention claimed is:

1. A linear motor armature comprising:
   an armature core including:
      a yoke extending straight; and
      a plurality of pole teeth fixed to the yoke and disposed along the yoke and spaced in a longitudinal direction of the yoke such that a slot is formed between two adjacent pole teeth;
   a plurality of excitation windings at least partially disposed in the slots formed in the armature core to excite the plurality of pole teeth; and
   a cooling device configured to cool the plurality of excitation windings using a coolant, the cooling device comprising:
      a first cooling conduit including:
         a first main conduit running zigzag, the first main conduit including a plurality of straight conduits extending inside the slots and a plurality of coupling conduits, each of which couples two adjacent straight conduits such that the plurality of straight conduits are connected in series; and
         a first pair of connecting conduits provided at both ends of the first main conduit;
      a second cooling conduit including:
         a second main conduit running zigzag and opposed to the first main conduit via the plurality of excitation windings, the second main conduit including a plurality of straight conduits extending inside the slots and a plurality of coupling conduits, each of which couples two adjacent straight conduits such that the plurality of straight conduits are connected in series; and
         a second pair of connecting conduits provided at both ends of the second main conduit; and
      a manifold provided to supply the coolant to the first cooling conduit and the second cooling conduit, wherein
   the manifold and the first and second pairs of connecting conduits are configured such that the coolant is supplied from one connecting conduit of the first pair of connecting conduits and one connecting conduit of the second pair of connecting conduits and discharged from the other connecting conduit of the first pair of connecting conduits and the other connecting conduit of the second pair of connecting conduits.

2. The linear motor armature according to claim 1, wherein:
the manifold is fixed to the armature core and includes one coolant inlet port, two coolant delivery ports each communicating with the one coolant inlet port, one coolant outlet port, and two coolant discharge ports each communicating with the one coolant outlet port; and
the first and second pairs of connecting conduits are shaped such that the one connecting conduit of the first pair of connecting conduits of the first cooling conduit and the one connecting conduit of the second pair of connecting conduits of the second cooling conduit are connected to the two coolant delivery ports, and that the other connecting conduit of the first pair of connecting conduits of the first cooling conduit and the other connecting conduit of the second pair of connecting conduits of the second cooling conduit are connected to the two coolant discharge ports.

3. The linear motor armature according to claim 2, wherein:
the manifold is fixed in the vicinity of one side surface of the armature core that is located in a direction in which the slots extend;
the first and second pairs of connecting conduits are disposed in a connecting conduit installation space located above the one side surface; and
the two coolant delivery ports and the two coolant discharge ports of the manifold each open toward the connecting conduit installation space.

4. The linear motor armature according to claim 3, wherein:
the connecting conduit of the first pair of connecting conduits that extends toward the manifold from a side opposite to a side where the manifold is located and the connecting conduit of the second pair of connecting conduits that extends toward the manifold from a side opposite to the side where the manifold is located intersect each other in the connecting conduit installation space to form an intersecting portion; and
the intersecting portion is at least partially located between the plurality of coupling conduits included in the first main conduit and the plurality of coupling conduits included in the second main conduit.

5. The linear motor armature according to claim 4, wherein:
the plurality of pole teeth include a plurality of wound pole teeth on which the excitation windings are wound and a plurality of non-wound pole teeth on which the excitation windings are not wound; and
the intersecting portion is located above the non-wound pole teeth.

6. The linear motor armature according to claim 4, wherein
the first and second pairs of connecting conduits are disposed such that the coolant flows through one of the first and second main conduits in a direction from the side where the manifold is located to the opposite side, and that the coolant flows through the other of the first and second main conduits in a direction from the opposite side to the side where the manifold is located.

7. The linear motor armature according to claim 1, wherein:
the first and second cooling conduits each have a rectangular cross-sectional shape; and
one of outer surfaces of each of the first and second cooling conduits faces the excitation windings.

8. The linear motor armature according to claim 2, wherein:
the first and second cooling conduits each have a rectangular cross-sectional shape; and
one of outer surfaces of each of the first and second cooling conduits faces the excitation windings.

9. The linear motor armature according to claim 3, wherein:
the first and second cooling conduits each have a rectangular cross-sectional shape; and
one of outer surfaces of each of the first and second cooling conduits faces the excitation windings.

10. The linear motor armature according to claim 4, wherein:
the first and second cooling conduits each have a rectangular cross-sectional shape; and
one of outer surfaces of each of the first and second cooling conduits faces the excitation windings.

11. The linear motor armature according to claim 5, wherein:
the first and second cooling conduits each have a rectangular cross-sectional shape; and
one of outer surfaces of each of the first and second cooling conduits faces the excitation windings.

12. The linear motor armature according to claim 6, wherein:
the first and second cooling conduits each have a rectangular cross-sectional shape; and
one of outer surfaces of each of the first and second cooling conduits faces the excitation windings.

* * * * *